(No Model.)
M. S. TRACY.
FRYING PAN.
No. 404,131. Patented May 28, 1889.
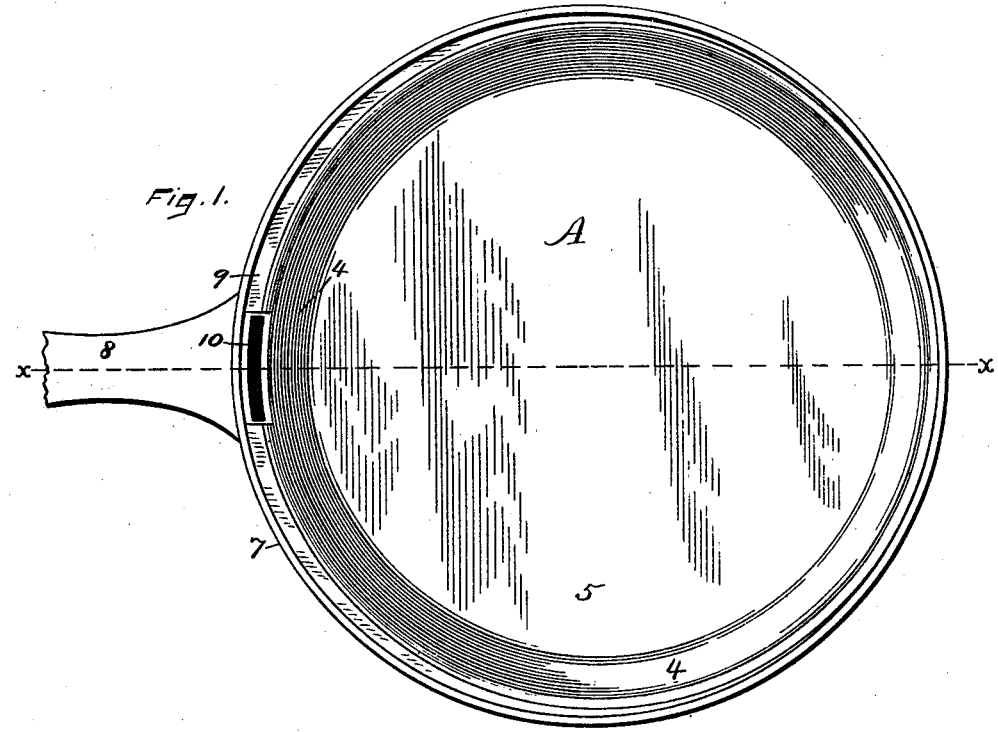
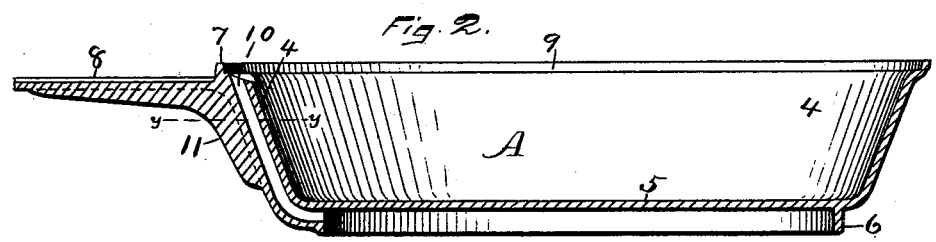
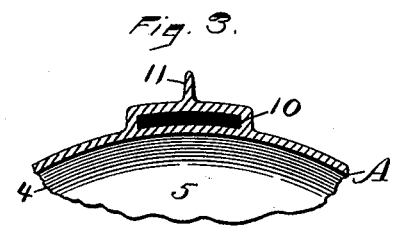
Witnesses.
John Edwards Jr.
F. M. Bailey
Inventor.
Milton S. Tracy
By James Shepard
Atty.

UNITED STATES PATENT OFFICE.

MILTON S. TRACY, OF GLASTONBURY, CONNECTICUT.

FRYING-PAN.

SPECIFICATION forming part of Letters Patent No. 404,131, dated May 28, 1889.

Application filed December 27, 1888. Serial No. 294,760. (No model.)

*To all whom it may concern:*

Be it known that I, MILTON S. TRACY, a citizen of the United States, residing at Glastonbury, in the county of Hartford and State of Connecticut, have invented certain new and useful Improvements in Frying-Pans, of which the following is a specification.

My invention relates to improvements in frying-pans and other culinary vessels of the class having a fume-passage; and the objects of my improvements are to make such vessels with a smooth interior and to otherwise improve their construction and efficiency.

In the accompanying drawings, Figure 1 is a plan view of my frying-pan. Fig. 2 is a vertical section thereof on line $x\,x$ of Fig. 1, and Fig. 3 is a horizontal section of a portion thereof on line $y\,y$ of Fig. 2.

The pan A may be of any shape in its general form. I have illustrated it as of a round form in plan view and with flaring sides 4 and a flat bottom, 5. The bottom rim, 6, Fig. 2, describes a circle and is concentric with the body of the pan and smaller than its bottom, while the top rim, 7, is eccentric thereto and somewhat larger, thereby leaving a seat, 9, for a cover, which seat is wider upon one side than elsewhere, as shown. The handle 8 projects from that side of the top rim, 7, which is most eccentric. At the handle side I form a fume-passage, 10, which extends from the widest portion of the cover-seat 9 downwardly on the exterior of the pan's sides 4, and then curves inwardly to the inside of the circle described by the bottom rim, 6. Said bottom rim is smaller than the bottom diameter of the pan, and consequently the opening at the lower end of the fume-passage is not only below but inside of the perimeter of the bottom of the pan. The cover-seat 9 is cut away a little on the inside at the top of the fume-passage 10, in order that said passage may open into the pan in case a flat cover or flat flanged cover is placed thereon. A brace, 11, is formed at the junction of the handle and outer wall of the fume-passage. It is evident that the same construction may be embodied in a double frying-pan or in a combined frying-pan and broiler, or in other culinary vessels.

I am aware that prior patents show frying-pans and other culinary vessels with a fume-passage that projects upon the inside, that in one instance such a pan has had the handle located on the smooth exterior of the pan at a point directly outside of the inwardly-projecting fume-passage, and that other patents show culinary vessels with smooth interior sides and a fume-passage upon the outside, with the opening at the lower end occupying a space outside of the perimeter of the bottom of said vessels. All of said prior art is hereby disclaimed.

By my improvement the interior of the pan may be on a true circle in plan view, and, whether it is circular or other shape, it may have smooth sides with no inwardly-projecting portion for the fume-passage, and therefore the pan is much more convenient to grind or polish, if desired, or to use and clean. The exterior is not unsightly, but the walls of the fume-passage look like a re-enforce for the handle. The bottom of the pan being imperforate, it is believed that there is less danger of defective castings than in pans having the fume-passage formed on the inside of the pan and through its bottom. By making the fume-passage extend through the bottom rim to a point inside of the perimeter of the bottom of the pan the walls of said fume-passage are complete in themselves independently of the base upon which the pan may rest without enlarging said bottom rim or making an offset that destroys its circular form. By making the top rim and cover-seat eccentric I obtain plenty of room for the fume-passage without greatly increasing the size of the pan or its weight. Of course the same fume-passage might be formed in a pan with a concentric top rim and cover-seat, the pan in all other respects being the same as shown.

I claim as my invention—

1. A frying-pan or culinary vessel having the inclosed fume-passage 10 extending on the exterior of its sides 4 downwardly and then inwardly through the bottom rim, 6, to a point inside the perimeter of the bottom, substantially as described, and for the purpose specified.

2. A frying-pan or culinary vessel having smooth interior sides, the fume-passage 10, extending on the exterior of the wall forming said smooth sides down to and through the bottom rim, 6, and the handle 8 and brace 11 on the projecting outer wall of said fume-passage, substantially as described, and for the purpose specified.

3. A frying-pan or culinary vessel having smooth sides 4, eccentric top rim and cover-seat, and the fume-passage 10, formed on the exterior of the sides 4 and extending from the wider portion of the cover-seat to the inside of the bottom rim, 6, substantially as described, and for the purpose specified.

MILTON S. TRACY.

Witnesses:
W. E. BEEBE,
M. W. CRANE.